United States Patent [19]

Schwartz et al.

[11] 3,985,926

[45] Oct. 12, 1976

[54] FLAME-RETARDANT CARPET

[75] Inventors: Judd Leonard Schwartz, Chester; Richard Eugene Mayer, Richmond, both of Va.

[73] Assignee: Allied Chemical Corporation, Morris Township, N.J.

[22] Filed: Aug. 27, 1975

[21] Appl. No.: 608,127

[52] U.S. Cl. .................................. 428/97; 428/95; 428/96; 428/920
[51] Int. Cl.² ..................... B32B 3/02; B32B 33/00
[58] Field of Search ................. 428/95, 96, 97, 920; 252/8.1

[56] References Cited
UNITED STATES PATENTS

| | | |
|---|---|---|
| 3,663,345 | 5/1972 | Jaisinghani............................ 428/97 |
| 3,719,547 | 3/1973 | Martin.................................. 428/96 |

*Primary Examiner*—Marion E. McCamish
*Attorney, Agent, or Firm*—Fred L. Kelly

[57] ABSTRACT

A flame-retardant, pile carpet having a relatively pliable primary backing and a tufted surface, said surface being comprised of fibers selected from the group consisting of polyester and polyamide fibers having incorporated therein from 1 to 15 percent by weight of a zinc compound selected from the group consisting of zinc oxide and zinc hydroxide, said fibers being bonded to said backing with a bonding substance comprising an ethylene-vinyl chloride latex material and a hydrate material selected from the group consisting of aluminum hydroxide and hydrated aluminum oxide, the ratio by weight of said latex material to said hydrate material being within the range 1:2 to 1:4.5.

10 Claims, No Drawings

FLAME-RETARDANT CARPET

BACKGROUND OF THE INVENTION

The present invention relates to a flame-retardant carpet and a process for the preparation thereof.

When carpeting is conventionally manufactured, the fibers or pile are tufted on a relatively pliable primary backing which may be manufactured from any suitable materials such as jute or a man-made fiber such as polypropylene. The non-wear side of the backing is then coated with a bonding material of any suitable type such as latex. The latex serves to satisfactorily hold the fibers in place so that they cannot be pulled free from the primary backing and also to bond the primary backing to the secondary backing. In the past, clay has been added to the latex as a filler to reduce the cost of the bonding compound. The secondary backing, which may also be jute or artificial fiber, strenghtens the carpet and ensures that the bonding material does not come into contact with the floor upon which the carpet is laid.

U.S. Pat. No. 3,418,267 granted Dec. 24, 1968 relates to flame-resistant polyamides and process thereof. The patent discloses that polyamide resin is made flame retardant by incorporating therein from 5 to 20 percent by weight of an organic halide, e.g., chlorinated biphenyl, which is reactive with the resin only at its pyrolysis temperature and from 3 to 15 percent by weight of an oxide of tin, lead, copper, iron, zinc or antimony.

U.S. Pat. No. 3,663,345, granted May 16, 1972, discloses a fire retardant carpet in which the pile fibers are fixed to the primary backing by a compound comprising a latex binding material combined with an aluminum hydrate.

U.S. Pat. No. 3,719,547, granted Mar. 6, 1973, describes a flame retardant pile fabric. A fibrous layer composed of combustible filaments or fibers extends from the top surface of a fibrous backing to present a pile surface. A coating of a film-forming halogen-containing polymer and a water-insoluble organo-phosphorus compound is applied to and confined essentially to the top surface of the backing. Where the backing is made of a thermoplastic material, a coating of the halogen-containing polymer may be used without the organo-phosphorus compound.

Although these patents are a major contribution to this art, investigations have been undertaken to produce carpeting that is significantly more flame retardant than the carpets disclosed in the prior art.

SUMMARY OF THE INVENTION

It is an object of this invention to provide a process for rendering pile carpets flame retardant without impairing their aesthetic properties. Another object of this invention is to provide pile carpets having flame-retardant properties which are prepared from polyester and polyamide fibers. It is a further object of this invention to provide a process which eliminates the necessity for applying the flame-retardant composition as a separate step in the process of preparing pile carpets.

In summary, the process of the present invention is an improvement over known processes for producing a pile carpet having a relatively pliable primary backing. through which polyamide or polyester fibers are tufted. The improvement comprises incorporating in said fibers from 1 to 15 percent by weight of a compound selected from the group consisting of lead oxide, iron oxide, zinc oxide and zinc hydroxide, and bonding said fibers to said backing with a bonding substance comprising a vinyl chloride copolymer latex material and a hydrate material selected from the group consisting of aluminum hydroxide, hydrated aluminum oxide and hydrated aluminum silicates such as kaolinite, dickite, nacrite and endellite, the ratio by weight of said latex material to said hydrate material being from 1:2 to 1:4.5.

The present invention provides a flame-retardant carpet which retains its aesthetic properties and is significantly more flame retardant than prior art carpets. We postulate that this improvement involves a synergistic interaction between the several elements of the present invention. In one preferred embodiment, the present invention provides a flame-retardant, pile carpet having a relatively pliable primary backing and a tufted surface, said surface being comprised of fibers selected from the group consisting of polyester and polyamide fibers having incorporated therein from 1 to 15 percent by weight of a zinc compound selected from the groups consisting of zinc oxide and zinc hydroxide, said fibers being bonded to said backing with a bonding substance comprising an ethylene-vinyl chloride copolymer latex material and a hydrate material selected from the group consisting of aluminum hydroxide and hydrated aluminum oxide, the ratio by weight of said latex material to said hydrate material being within the range 1:2 to 1:4.5.

The term "flame-retardant carpet" is used herein to mean that the carpet burns very slowly in a confined area when exposed in air to a direct flame or its equivalent. The preferred method of testing for flame-retardant properties may be referred to as the "Flooring Radient Panel Test" developed by the Armstrong Cork Company and described in a report entitled *NBSIR 74-495-Development of a Radiant Panel Test for Flooring Materials*, which report is available from National Bureau of Standards, U.S. Department of Commerce.

The test apparatus comprises a gas fired refractory radient panel inclined at a 30° angle over the exposed portion of a horizontally mounted test specimen. The specimen surface is 3–9 inches below the lower edge of the radient panel. The radient panel and an adjustable height specimen transport system are enclosed in an asbestos millboard sheathed chamber with provision for a free flow of draft-free air to simulate natural burning conditions. There is a glass viewing window in the front face of the chamber. Below the window is a door which can be opened to facilitate placement and removal of the test specimen. In the examples herein, the test conditions selected involve a 30° panel angle, a panel temperature of 525° C. and the distance from panel to sample was 5.5 inches. Distance burned (cm.) was recorded and flux distribution curves were determined in terms of flux (watts/cm.$^2$) and location (cm.).

DESCRIPTION OF THE PREFERRED EMBODIMENT

The preferred polyamides which are useful in the improved flame-retardant carpets of the present invention include polycaprolactam (6 nylon), the polyamides which are derived from the condensation of a dicarboxylic acid with a diamine, such as polyhexamethylene adipamide (66 nylon) and polyhexamethylene sebacamide (610 nylon), and copolymers thereof. The preferred polyesters are the linear terephthalate polyesters, i.e., polyesters of a glycol containing from 2 to 20 carbon atoms and a dicarboxylic acid component containing at least about 75% terephthalic acid. The remainder, if any, of the dicarboxylic acid component may be any suitable dicarboxylic acid such as sebacic acid, adipic acid, isophthalic acid, sulfonyl-4,4'-dibenzoic acid, or 2,8-di-benzofuran-dicarboxylic acid. The glycols may contain more than two carbon atoms in the chain, e.g., diethylene glycol, butylene glycol, decamethylene glycol, and bis-1,4-(hydroxymethyl)cyclohexane. Examples of linear terephthalate polyesters which may be employed include poly(ethylene terephthalate), poly(butylene terephthalate), poly(ethylene terephthalate/5-chloroisophthalate) (85/15), poly(ethylene terephthalate/5-[sodium sulfo]isophthalate) (97/3), poly(cyclohexane-1,4-dimethylene terephthalate), and poly(cyclohexane-1,4-dimethylene terephthalate/hexahydroterephthalate) (75/25).

The primary carpet backing is made from any suitable material. It may be a conventional woven jute construction. Also, the backing may be made of a nonwoven fibrous mass made of cellulosic or non-cellulosic material including nylon, polyester, and polyolefin. Other fabric backing structures likewise can be used.

The preferred ethylene-vinyl chloride copolymer latex for use in the present invention is a known composition which is commercially available. For example, it may be purchased under the trademark POLVIN 2500 from Monsanto Company. A typical process for preparing stable ethylene/vinyl chloride copolymer latices is disclosed in U.S. Pat. No. 3,399,157, granted Aug. 27, 1968.

In the preferred latex-hydrate bonding composition of the present invention, it has been found that an aluminum hydrate will produce the desired result in a very satisfactory manner if proper material ratios are used. It has been determined that if either aluminum hydroxide or hydrated aluminum oxide is used, a bonding composition having a latex to hydrate weight ratio within the range 1:2 to 1:4.5 will produce an excellent fire retardant carpet. Preferably, a latex to hydrate weight ratio within the range 1:2 to 1:4 is used.

As to the manner of introducing the aforesaid zinc oxide or zinc hydroxide into the polyester or polyamide fiber, it may be added to the polymer at the time of polymerization, or it may be melt blended with the polymer pellets at the time of melt spinning. The concentration of the zinc compound in the polymer is preferably 1 to 15 percent by weight, more preferably 3 to 12 percent.

EXAMPLE 1

A reactor equipped with a heater and stirrer was charged with a mixture of 1,520 parts of e-caprolactam and 80 parts of aminocaproic acid. The mixture was then flushed with nitrogen and was stirred and heated to 255° C. over a one hour period at atmospheric pressure to produce a polymerization reaction. The heating and stirring was continued at atmospheric pressure under a nitrogen sweep for an additional 4 hours in order to complete the polymerization. Nitrogen was then admitted to the reactor and a small pressure was maintained while the polymer was extruded from the reactor in the form of a polymer ribbon. The polymer ribbon was subsequently cooled, pelletized, washed and then dried. The polymer was a white solid having a relative viscosity of about 50 to 60 as determined at a concentration of 11 grams of polymer in 100 ml. of 90 percent formic acid at 25° C. (ASTMD-789-62T).

About 50 parts of the polymer pellets were blended with 3 parts of finely divided zinc oxide in a conventional blender and melt extruded under pressure of 1,500 p.s.i.g. to a 70-orifice spinnerette to produce a fiber having about 3,600 denier. The fiber was collected, drawn at about 3.2 times the extruded length and textured with a steam jet to produce yarn suitable for use in carpet. This yarn will hereinafter be called Yarn A. A control yarn containing no zinc oxide was prepared in the same manner as described above. This yarn will hereinafter be called Yarn B.

The yarns were then two-plied by twisting two ends together with a 1.5 S twist. The yarns were tufted into a level loop 20 oz./yd.$^2$ carpet at about 8.0 stitch rate. A relatively pliable nonwoven polypropylene fabric was used as the primary backing. Tufting was carried out on a conventional tufting machine operated to give a pile having a height of 5/32 to 7/32 inch.

About 8 parts of a 50% emulsion of a 25/75 ethylene-vinyl chloride copolymer latex was mixed with 8 parts of hydrated aluminum oxide to form a binding composition. On a dry basis, the latex hydrate weight ratio of the binding composition was 1:2. The mixture was then applied onto the fabric described in the preceding paragraph by conventional means at the rate of 32 oz./yd.$^2$ of carpet on a dry basis. With the dilution described, the penetration of the mixture past the backing and into the tufts of the fabric was less than 1/16 inch so that the aesthetic properties of the pile carpet was not impaired. The carpeting was backed with a secondary jute backing and then passed through an oven at about 125° C. to cure the latex on the carpet. The following table compares the carpets made from Yarn A and Yarn B with respect to the distance burned and the critical energy necessary to propagate the flame as measured by the above-described Flooring Radient Panel Test.

| Carpet System | Distance Burned (cm.) | Critical Energy, watts/cm.$^2$ |
|---|---|---|
| Made with Yarn A | 11 | 1.04 |
| Made with Yarn B | 21 | 0.88 |

Clearly, the carpet made with Yarn A was significantly more flame-retardant than the carpet made with Yarn B.

EXAMPLE 2

Control carpets were also prepared from Yarn A and Yarn B in accordance with Example 1 except that a conventional styrene-butadiene rubber (SBR) latex was used instead of the ethylene-vinyl chloride copolymer (EVC) latex of the present invention. The following table compares the resulting carpets with the carpets made in Example 1, using the above-described Flooring Radient Panel Test. In these tests the standard deviation ($\sigma$) of the distance burned was about 1.7 cm. so that a difference of 5 cm. is highly significant.

| Carpet System | | Distance Burned (cm.) | Critical Energy watts/cm.$^2$ |
|---|---|---|---|
| Fiber | Latex | | |
| Yarn B | SBR | 47 | 0.40 |
| Yarn A | SBR | 31 | 0.67 |
| Yarn B | EVC | 21 | 0.88 |

-continued

| Carpet System | | Distance Burned (cm.) | Critical Energy watts/cm.² |
| --- | --- | --- | --- |
| Fiber | Latex | | |
| Yarn A | EVC | 11 | 1.04 |

These data show that for optimum flame-retardancy it is critical to use both Yarn A (containing ZnO) and the ethylene-vinyl chloride copolymer latex in accordance with the present invention.

In additional comparative tests, it was shown that the use of aluminum hydroxide or hydrated aluminum oxide is also a critical element of the present invention. For example, a conventional carpet containing calcium carbonate as filler instead of hydrated aluminum oxide was completely burned in the above-described Flooring Radiant Panel Test.

We claim:

1. A flame-retardant, pile carpet having a relatively pliable primary backing and a tufted surface, said surface being comprised of fibers selected from the group consisting of polyester and polyamide fibers having incorporated therein from 1 to 15 percent by weight of a zinc compound selected from the group consisting of zinc oxide and zinc hydroxide, said fibers being bonded to said backing with a bonding substance comprising an ethylene-vinyl chloride copolymer latex material and a hydrate material selected from the group consisting of aluminum hydroxide and hydrated aluminum oxide, the ratio by weight of said latex material to said hydrate material being within the range 1:2 to 1:4.5.

2. The carpet of claim 1 wherein the fibers are polyamide fibers.

3. The carpet of claim 1 wherein the fibers are polyester fibers.

4. The carpet of claim 1 wherein 3 to 12 percent by weight of the zinc compound is incorporated in the fiber.

5. The carpet of claim 1 wherein the zinc compound is zinc oxide.

6. The carpet of claim 1 wherein the zinc compound is zinc hydroxide.

7. The carpet of claim 1 wherein the hydrate material is aluminum hydroxide.

8. The carpet of claim 1 wherein the hydrate material is hydrated aluminum oxide.

9. A flame-retardant, pile carpet having a relatively pliable primary backing and tufted surface, said surface being comprised of polyamide fibers having incorporated therein from 1 to 15 percent by weight of zinc oxide, said fibers being bonded to said backing with a bonding substance comprising an ethylene-vinyl chloride copolymer latex material and hydrated aluminum oxide, the ratio by weight of said latex material to said hydrate material being within the range 1:2 to 1:4.5.

10. In a process for producing a pile carpet having a relatively pliable primary backing through which polyamide or polyester fibers are tufted, the improvement which comprises incorporating in said fibers from 1 to 15 percent by weight of a compound selected from the group consisting of lead oxide, iron oxide, zinc oxide and zinc hydroxide, and bonding said fibers to said backing with a bonding substance comprising a vinyl chloride copolymer latex material and a hydrate material selected from the group consisting of aluminum hydroxide, hydrated aluminum oxide and hydrated aluminum silicates, the ratio by weight of said latex material to said hydrate material being within the range 1:2 to 1:4.5, whereby the carpet has improved flame retardancy.

* * * * *